United States Patent [19]

Curley et al.

[11] Patent Number: 4,818,828

[45] Date of Patent: Apr. 4, 1989

[54] ELECTRONIC KEYBOARD

[75] Inventors: Charles M. Curley, Ithaca; Scott J. Longrod, Lansing, both of N.Y.

[73] Assignee: Smith Corona Corporation, Cortland, N.Y.

[21] Appl. No.: 209,164

[22] Filed: Jun. 17, 1988

[51] Int. Cl.$^4$ ...................... H01H 13/70; G06C 7/02; G06F 3/02

[52] U.S. Cl. .................................... 200/5 A; 200/517; 200/345; 235/145 R; 400/479

[58] Field of Search .................... 200/5 A, 159 B, 243, 200/329, 340; 361/398; 400/472, 473, 479, 479.1, 479.2, 496; 235/145 R

[56] References Cited

U.S. PATENT DOCUMENTS

| | | | |
|---|---|---|---|
| 3,699,294 | 10/1972 | Sudduth | 200/243 |
| 3,879,602 | 4/1975 | Walker | 235/145 R |
| 3,909,564 | 9/1975 | Scheingold et al. | 200/5 A X |
| 3,932,722 | 1/1976 | Obata et al. | 200/340 |
| 3,982,081 | 9/1976 | Demler | 200/5 A X |
| 4,188,137 | 2/1980 | Dannatt | 400/496 |
| 4,251,723 | 2/1981 | Speidel et al. | 250/229 |
| 4,269,521 | 5/1981 | Longrod | 400/472 |
| 4,315,114 | 2/1982 | Monti, Jr. | 200/314 |
| 4,419,555 | 12/1983 | Kim | 200/159 A |
| 4,440,515 | 4/1984 | Nassimbene | 400/479 |
| 4,493,952 | 1/1985 | Kaleida | 200/5 A |

*Primary Examiner*—J. R. Scott

[57] ABSTRACT

A full sized electronic keyboard with full travel keybuttons provides switches for controlling an electronic typewriter or for controlling other devices. The keyboard has a structure designed for reducing part count and switch component part size and for simplifying assembly to minimize manufacturing cost. The structure has integral one piece parts for accommodating several keybutton actions. The integral one piece parts include a main frame, a sheet steel spring, a rubber dome switch member, and a printed circuit switch panel.

6 Claims, 3 Drawing Sheets

ELECTRONIC KEYBOARD

BACKGROUND OF THE INVENTION

1. Field of the Invention

This invention relates to an electronic keyboard for controlling electronic typewriters or the like and, more particularly it relates to a full sized electronic keyboard with full travel keybuttons having a low part count and reduced switch component part size and having a low assembly cost.

2. Prior Art

Known prior art patents disclose full sized electronic keyboards with full travel keybuttons having a low part count. These patents have significantly different structure relative to each other and relative to the present structure.

One of these known patents is U.S. Pat. No. 4,315,114 issued on Feb. 9, 1982 to James H. Monti, Jr. This patent discloses the use of a rubber dome switch and the use of an integrally formed sheet steel spring to accommodate several keybuttons. This patent does not disclose a full sized keyboard and does not disclose one row of rubber dome switches nor one row of spring fingers to accommodate two rows of keybuttons. The sheet steel spring in this patent does not control movement of the keybuttons between rest and depressed positions.

U.S Pat. No. 3,879,602 issued on Apr. 22, 1975 to Alexander D. R. Walker discloses spring fingers actuated by keybuttons for closing contacts to provide output signals. This patent does not disclose one row of switches nor one row of spring fingers to accommodate two rows of keybuttons. The spring fingers in this patent do not control movement of the keybuttons between rest and depressed positions.

U.S. Pat. No. 4,188,137 issued on Feb. 12, 1980 to Hugh St. L. Dannatt discloses two rows of spring fingers to accommodate four rows of keybuttons. This patent also discloses the spring fingers connected to keylevers in such a manner to control the movement of the keybuttons between rest and depressed positions. However, this patent uses a keylever between the keybutton and the spring finger which increases the part count and the assembly time and which has a significantly different structure relative to the present structure.

U.S. Pat. No. 4,493,952 issued on Jan. 15, 1985 to Richard H. Kaleida discloses a printed circuit switch panel with lead conductors on an integral tail. This patent does not disclose one row of switches to accommodate two rows of keybuttons.

SUMMARY OF THE INVENTION

The electronic keyboard for providing output signals for an electronic typewriter has a structure designed for reducing part count and switch component part size and for simplifying assembly to minimize manufacturing cost.

This is accomplished by having integrally formed one piece parts to accommodate all of the keybuttons on the keyboard. The one piece parts include a main frame, a simple flat sheet steel spring having an integrally stamped spring finger for each keybutton, a rubber dome switch member having a switch contact for each keybutton, a printed circuit switch panel having an open switch circuit pattern for each keybutton and having an integral tail with lead conductors, and a rigid plate to firmly support the printed circuit switch panel and rubber dome switch member for closing the switch contact and the switch circuit pattern.

The manufacturing cost of the printed circuit pattern panel and the rubber dome switch member is relatively high compared to other typewriter parts and is based on their actual size. The keyboard geometry has been oriented to concentrate these high cost switch components into a narrow band at the center of the keyboard. The printed circuit switch panel and the rubber dome switch member have two rows of switch contacts to accommodate four rows of keybuttons. Since two rows of switch contacts accommodate four rows of keybuttons, the actual size of the printed circuit panel is approximately one-half the size of a standard keyboard. The actual size of the rubber dome switch member is approximately one-third the size of a standard keyboard. This size reduction significantly reduces the manufacturing cost.

The spring fingers integrally stamped from the sheet steel have a unique shape to provide a desirable touch for keybutton depression, to provide sufficient rigidity for closing the switch contacts, to provide overtravel for closing the switch contacts reliably, and to provide a structure for engaging the keybuttons. The structure on the spring fingers for engaging the keybuttons control the movement of the keybuttons between a rest position and a depressed position with minimum resistance. Also, the structure is located on each spring finger forming one row to accommodate two rows of keybuttons and to be substantially parallel to the row of switch contacts on the rubber dome switch member.

Accordingly, an object of this invention is to provide an efficient and reliable electronic keyboard for an electronic typewriter having a structure designed to reduce part count and switch component part size and to simplify assembly to minimize manufacturing costs relative to known commercial keyboards. The minimized manufacturing cost is particularly important when used in portable electronic typewriters which have a relatively high rate of production.

Another object of this invention is to provide an electronic keyboard having a relatively flat structure which is particularly desirable when used in portable electronic typewriters.

Other objects, features and advantages of the invention will become more apparent from the following description, including appended claims and accompanying drawing.

DETAILED DESCRIPTION OF THE INVENTION

Figure 1:
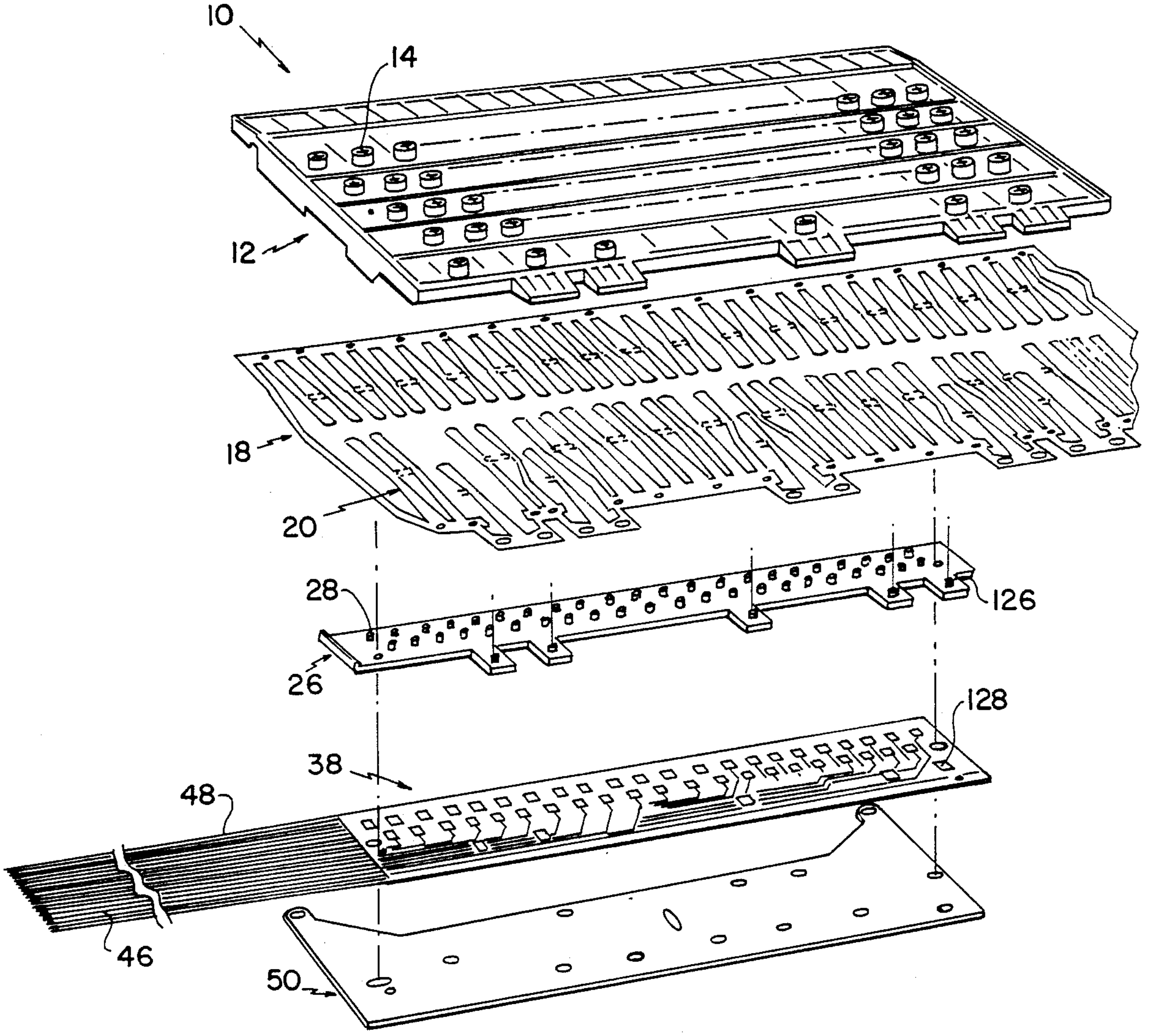
FIG. 1 is an perspective view showing the integral one piece parts according to the present invention.
Figure 2:
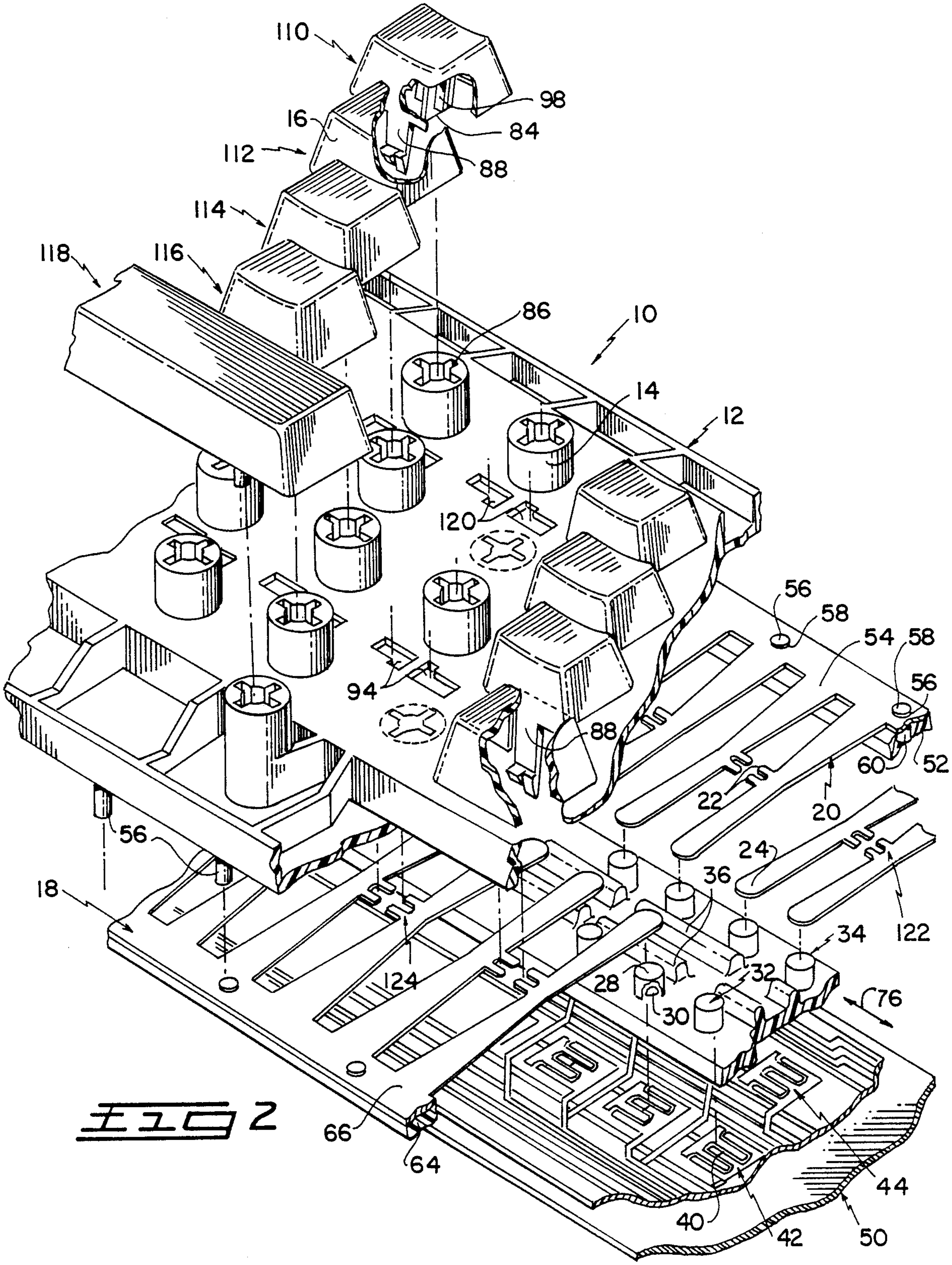
FIG. 2 is an perspective view with sections cut away showing the assembly relationship of the integral one piece parts.
Figure 3:
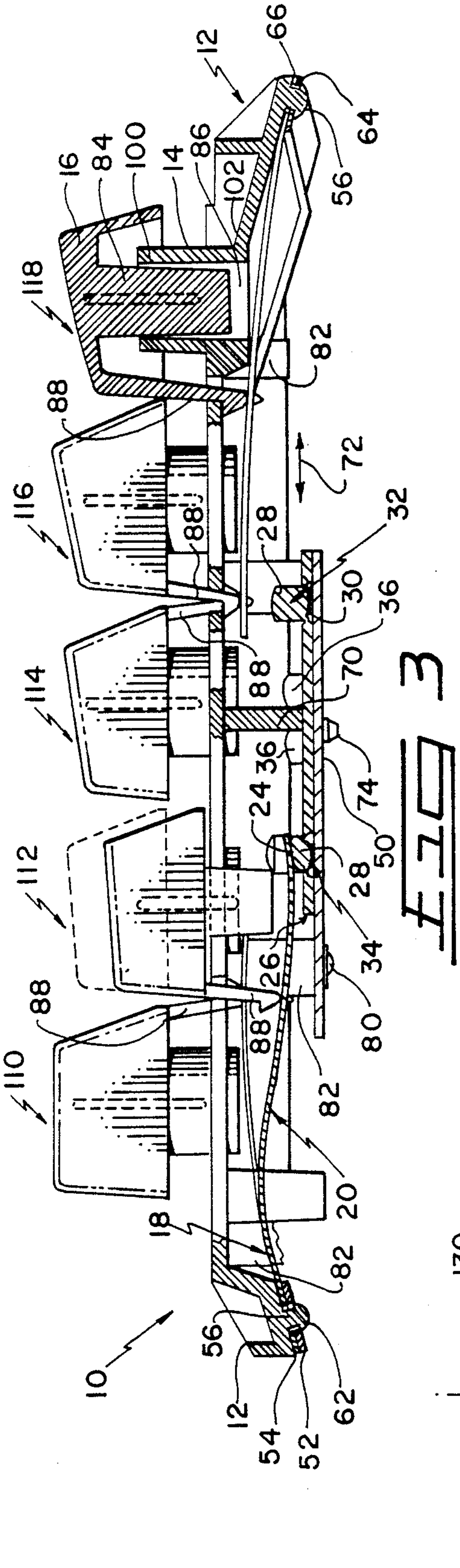
FIG. 3 is a left side elevational view in section showing the keyboard assembled.

An electronic keyboard 10 according to the present invention is shown in the drawing. Referring to FIG. 1, a main frame 12 is a molded plastic part with integrally formed cylindrical shaped bosses 14 projecting upward. Each boss 14 support a keybutton 16 (FIGS. 2 and 3). A flat sheet steel spring 18 has a spring finger 20 integrally formed therefrom for each keybutton 16. Each spring finger 20 has two parallel projections 22 integrally formed therefrom perpendicular relative to the length of the spring finger 20. Each spring finger 20 also has a free end 24. A rubber dome switch member 26 has an upwardly projecting cylindrical shaped dome 28 integrally formed therefrom for each keybutton 16. An electrically conductive rubber switch contact 30 is bonded on the underside of the dome 28. The rubber dome switch member 26 has a first row 32 and a second row 34 of the domes 28. A plurality of ribs 36 integrally formed from the rubber dome switch member 26 project upward. A printed circuit switch panel 38 has a switch circuit pattern 40 for each keybutton 16. The printed circuit switch panel 38 has a first row 42 and a second row 44 of the switch circuit patterns 40. A tail 46 integrally extending from the printed circuit switch panel 38 has lead conductors 48 for electronically connecting the electronic keyboard 10 to an electronic typewriter. A rigid plate 50 provides a firm support for the printed circuit switch panel 38 and the rubber dome switch member 26 for closing the switch contact 30 and the switch circuit pattern 40.

Referring now to FIGS. 2 and 3, the spring 18 is assembled to the main frame 12 by a sheet metal bar 52 holding one border 54 of the spring 18 against the main frame 12. Several plastic posts 56 integrally formed from the main frame 12 extend through corresponding holes 58 in the border 54 and holes 60 in the sheet metal bar 52. The posts 56 are then heated to form heads 62 which rigidly assembles the sheet metal bar 52 and the border 54 against the main frame 12. This assembly rigidly mounts one end of each spring finger 20 to the main frame 12. Additional posts 56 rigidly assembles a second sheet metal bar 64 and a second border 66 of the spring 18 against the main frame 12.

The rubber dome switch member 26 is oriented relative to the main frame 12 by a rib 70 integrally formed from the main frame 12 seating between parallel ribs 36 on the rubber dome switch member 26 (FIG. 3). This prevents lateral movement in a first direction shown by an arrow 72 of the rubber dome switch member 26 relative to the main frame 12. A post 74 (only one of three shown) integrally formed from the main frame 12 extends through the rubber dome switch member 26 to prevent lateral movement in a second direction shown by arrow 76 (FIG. 2).

The printed circuit switch panel 38 is oriented relative to the main frame 12 and relative to the rubber dome switch member 26 in the lateral directions of the arrows 72 and 76 by the three posts 74. This orientation aligns each switch circuit pattern 40 with a corresponding switch contact 30. The rigid plate 50 is mounted on the main frame 12 by several screws 80 threaded into corresponding posts 82.

Figure 4:
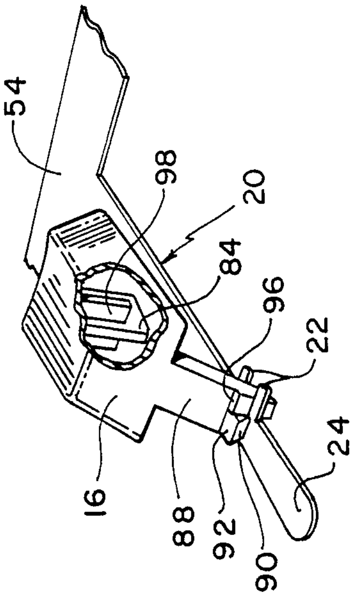
FIG. 4 is a perspective view showing a keybutton engaging a spring finger.

Each keybutton 16 has an integrally formed central guide stem 84 seated in a guide slot 86 in the boss 14 for guiding the movement of the keybutton 16 between a rest position and a depressed position. A spring actuator 88 (FIG. 4) is integrally formed from the keybutton 16. The spring actuator 88 has an abutment 90 which abuts against the spring finger 20 adjacent to the projections 22. The abutment 90 has a stepped shape hook 92 for passing through an aperture 94 in the main frame 12 and for hooking the underside of the main frame 12 to snap-fit assemble the keybutton 16 to the main frame 12. The snap-fit assembly is provided by the combination of the spring actuator 88 seated in the aperture 94 and the guide stem 84 seated in the crossed shaped guide slot 86 in the boss 14. The spring actuator 88 has an integrally formed control finger 96 located adjacent to the abutment 90. The control finger 96 seats in between the two projections 22 on the spring finger 20 for controlling the movement of the keybutton 16 between the rest position and the depressed position.

The guide stem 84 is formed by integral cross shaped ribs 98 which seat in the cross shaped guide slots 86. The guide slots 86 at the upper end 100 of the post 14 are dimensioned to be slightly larger than the ribs 98. The guide slots 86 are tapered away from the ribs 98 from the upper end 100 to the lower end 102 of the boss 14. This arrangement minimizes the amount of rubbing friction between the guide stem 84 and the boss 14 during movement of the keystem 16. By having the spring actuator 88 of the keybutton 16 engage the spring finger 20 and by having the guide stem 84 guided only at the upper end 100 of the boss 14, the resistance of the movement of the keybutton 16 between the rest position and the depressed position is minimized.

The keybuttons 16 are arranged in five rows 110, 112, 114, 116 and 118. The spring actuator 88 on two adjacent keybuttons 16 in rows 110 and 112 extend through adjacent apertures 120 in the main frame 12 (FIG. 2). The spring actuators 88 from the two adjacent keybuttons 16 then engage the spring fingers 20 and the projections 22 at a location forming one row 122 which is substantially parallel to the second row 34 of the domes 28. In a similar manner, the spring actuators 88 on two adjacent keybuttons 16 in rows 114 and 116 extend through adjacent apertures 94. The spring actuators 88 then engage the spring fingers 20 and the projections 22 at a location forming a second row 124, which is substantially parallel to the first row 32 of the domes 28.

Referring to FIG. 1, there are bosses 14 for five keybuttons 16 in the row 118. The rubber dome switch member 26 has a third row 126 of the domes 28 and the printed circuit switch panel 38 has a third row 128 of the switch circuit patterns 40 to accommodate the keybuttons 16 in the row 118. The third row 126 of the domes 28 is arranged on the rubber dome switch member 26 to minimize the actual size of the rubber dome switch member 26. The third row 128 of the switch circuit patterns 40 is arranged on the printed circuit switch panel 38 to minimize the actual size of the printed circuit switch panel 38. Having the third rows 126 and 128 arranged in this manner contributes to the reduced manufacturing cost of these two switch component parts.

The operation of the keyboard 10 will now be described. Depressing a keybutton 16 in row 112 (FIG. 3), the free end 24 of a spring finger 20 presses a dome 28 in the second row 34 downward until a switch contact 30 engages and closes a switch circuit pattern 40. The closed switch circuit pattern 40 allows an electronic signal representing the particular depressed keybutton 16 to flow through the lead conductors 48 in the tail 46. This electronic signal provides an output from the keyboard 10 to an electronic typewriter or to other devices capable of using the output signal. When the depressed keybutton 16 is released, the spring finger 20 is biased to its initial position and the keybutton 16 is biased to its initial position by the spring finger 20 due to tension added to the spring finger 20 responsive to the depressions of the keybutton 16. The dome 28 is biased to its initial position, when released by the free end 24 of the spring finger 20, due to tension added to the rubber dome switch member 26 responsive to depression of the dome 28 by the free end 24 of the spring finger 20.

When a keybutton 16 in the row 114 is depressed, a corresponding free end 24 of a spring finger 20 presses a dome 28 downward in the first row 32, which is the same row as the keybutton 16 in the row 116. The domes 28 in the first row 32 are in alignment with the switch circuit patterns 40 in the first row 42 of the printed circuit switch panel 38. When a keybutton 16 in either row 110 or row 112 is depressed, a corresponding free end 24 of a spring finger 20 presses a dome 28 downward in the second row 34. The domes 28 in the second row 34 are in alignment with the switch circuit patterns 40 in the second row 44.

When depressing keybuttons 16 in rows 110 and 112, the spring actuators 88 engage the spring fingers 20 along the row 122. When depressing keybuttons 16 in rows 114 and 116, the spring actuators 88 engage the spring fingers 20 along the row 124. The unique design of the spring fingers 20 provides the overtravel and the rigidity for reliably closing the switch contacts and provides the desirable touch in regard to the force required to depressing the keybuttons 16.

Providing the desirable touch is also accomplished by the present keyboard 10 having the full travel keybutton. A switch contact 30 closes a switch circuit pattern 40 before a keybutton 16 is fully depressed. In this manner, an operator is able to operate the keyboard 10 without having the keybutton 16 abruptly stopped by full depressions which minimizes operator fatigue. If full depressions were required, such as on non-full travel keyboards, operator fatigue would be reached after typing only a very short period of time.

Figure 5:
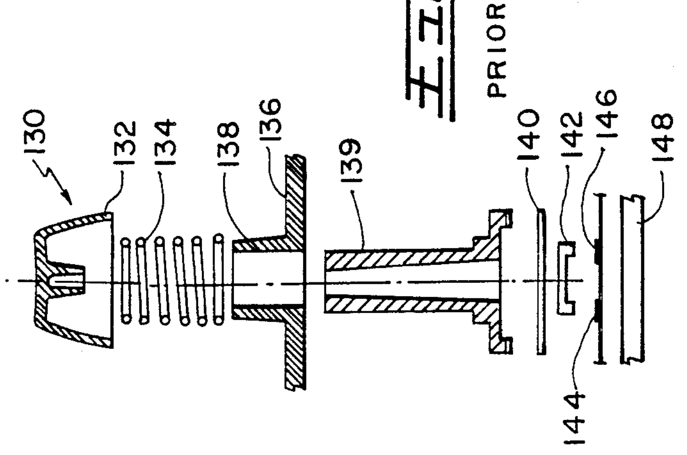
FIG. 5 PRIOR ART
FIG. 5 is an exploded elevational view of a prior art keybutton assembly.

Referring to FIG. 5, a prior art full travel keybutton assembly 130 as used in a full sized electronic keyboard in an electronic typewriter is shown exploded. This keyboard is an example of known commercially used keyboards which have a relatively high part count compared to the present keyboard 10.

The parts in the keybutton assembly 130 are a keybutton 132, an independent coil spring 134, a main frame 136 having guide bosses 138, a key plunger 139, a urethane spring 140 and a conductive rubber contact member 142. A full sized printed circuit switch panel 144 has four rows of switch circuit patterns 146 to accommodate four rows of keybutton assemblies 130. A sheet metal base 148 provides a rigid support for the printed circuit switch panel 144. The part count is relatively high since each keybutton assembly 130 has several individual parts which are not needed in the present keybutton assembly. The additional individual parts are the coil spring 134, the key plunger 139, the urethane spring 140 and the conductive rubber contact member 142. When these additional parts are multiplied by fifty six, which is a typical number of keybutton assemblies on a full sized keyboard, the part count is approximately four times higher than the present keyboard 10.

The structure of the present keyboard 10 has been designed to simplify assembly as well as to reduce part count and switch component part size. The main frame 12 is molded as a single plastic part. The sheet steel spring 18 is a simple flat stamping which is rigidly assembled to the mainframe 12 in a single operation. The rubber dome switch member 26 and the printed circuit switch panel 38 are placed on the main frame 12 and aligned by guide posts 74. The rigid plate 50 is attached to the mainframe 12 by screws 80. The keybuttons 16 are inserted into the bosses 14 by a method not disclosed in this specification and the control fingers 96 automatically seat between two projections 22 on the spring fingers 20.

In summary, it can now be understood that the present invention provides an efficient and reliable full sized electronic keyboard with full travel keybuttons and with a structure designed for reducing part count and switch component part size. The one piece parts shown in FIG. 1 substantially reduces the part count relative to known commercial keyboards. Having two rows of keybuttons actuate spring fingers in one row for closing switch contacts in one row reduces the size of the relatively high priced electronic parts. These electronic parts, which provide the switch contacts, are the rubber dome switch member and the printed circuit switch panel.

What is claimed is:

1. A keyboard assembly, comprising:
- a main frame;
- a plurality of keybuttons supported on the main frame for full travel movement between a rest position and a depressed position, the keybuttons being arranged in at least two rows;
- switch contact means for each keybutton mounted on the main frame and being arranged in at least one row;
- a spring finger for each keybutton having one end rigidly mounted on the main frame; and
- the two rows of keybuttons contact the spring fingers at a location forming one row substantially parallel to the row of the switch contact means for moving the spring fingers to actuate the switch contact means responsive to depression of the keybuttons to provide keyboard outputs.

2. The keyboard assembly of claim 1 wherein the switch contact means includes a printed circuit switch panel having switch circuit patterns aligned in one row for actuation by the two rows of keybuttons.

3. The keyboard assembly of claim 1 wherein the switch contact means includes a rubber dome switch member having switch contacts aligned in one row for actuation by two rows of keybuttons.

4. The keyboard assembly of claim 1 wherein the switch contact means includes a printed circuit switch panel having switch circuit patterns aligned in one row, and a rubber dome switch member having switch contacts aligned in one row for engaging the switch circuit patterns of the printed circuit switch panel in response to movement of the keybuttons in the two rows of keybuttons to the depressed position for providing keyboard outputs.

5. A keyboard assembly, comprising:
- a main frame;
- a plurality of keybuttons supported on the main frame for movement between a rest position and a depressed position, the keybuttons being arranged in a first two rows and a second two rows; switch contact means for each keybutton mounted on the main frame and being arranged in a first row and a second row;
- a spring finger for each keybutton mounted on the main frame;
- the first two rows of keybuttons contact the spring fingers at a location forming one row substantially parallel to the first row of the switch contact means for moving the spring fingers to actuate the switch contact means in response to depression of the first two rows of keybuttons to provide keyboard outputs; and the second two rows of keybuttons contact the spring fingers at a location forming a second row substantially parallel to the second row of the switch contact means for moving the spring fingers to actuate the switch contact means in response to depression of the second two rows of keybuttons to provide keyboard outputs.

6. A keyboard assembly, comprising:

a main frame;

a plurality of keybuttons supported on the main frame for movement between a rest position and a depressed position, each keybutton includes a spring actuator integrally formed therefrom;

a spring mounted on the main frame, the spring includes a spring finger integrally formed therefrom for each of the plurality of keybuttons, each spring finger includes a free end integrally formed therefrom for movement between a rest position and an actuated position, a structure integrally formed therefrom engaging the spring actuator on the keybutton for controlling the movement of the keybutton between the rest position and the depressed position with minimum resistance and for biasing the keybutton from a depressed position to a rest position and for moving the free end of the spring finger from the rest position to the depressed position in response to keybutton depression;

a rigid plate mounted on the main frame;

a printed circuit switch panel supported on the plate and having an open switch circuit pattern for each of the plurality of keybuttons;

a rubber dome switch member located between the printed circuit switch membrane and the spring fingers, the rubber dome switch member having a switch contact located adjacent each open switch circuit pattern; and the free end of the spring finger moves the switch contact to close the open switch circuit pattern when moved to the actuated position responsive to depression of a selected keybutton to detect a keyboard signal for controlling an electronic typewriter.

* * * * *